(12) United States Patent
Fujiwara et al.

(10) Patent No.: US 7,327,363 B2
(45) Date of Patent: Feb. 5, 2008

(54) IMAGE PROCESSING APPARATUS, AND COMPUTER PROGRAM

(75) Inventors: Koichi Fujiwara, Kobe (JP); Osamu Toyama, Kakogawa (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 87 days.

(21) Appl. No.: 11/243,025

(22) Filed: Oct. 4, 2005

(65) Prior Publication Data
US 2006/0071930 A1    Apr. 6, 2006

(30) Foreign Application Priority Data
Oct. 5, 2004    (JP)    ............................. 2004-292410

(51) Int. Cl.
*G06T 15/00*    (2006.01)
(52) U.S. Cl. ....................... 345/424; 345/620; 382/132; 382/285
(58) Field of Classification Search ................ 345/424, 345/620; 382/131–132, 285, 293
See application file for complete search history.

(56) References Cited

U.S. PATENT DOCUMENTS 6,674,430 B1 *    1/2004    Kaufman et al. ........... 345/419
7,120,283 B2 *    10/2006    Thieret et al. .............. 382/131
7,187,390 B2 *    3/2007    Usami et al. ............... 345/620

FOREIGN PATENT DOCUMENTS

JP    2000-105105 A    4/2000

* cited by examiner

*Primary Examiner*—Phu K. Nguyen
(74) *Attorney, Agent, or Firm*—Sidley Austin LLP (57) ABSTRACT

When volume data of a three-dimensional object to be processed is read and stored into a predetermined storage, first, a plurality of reference planes are set and a plurality of reference distance maps each indicative of distribution of distances between the three-dimensional object and each of the reference planes are generated. Next, when an actual projection plane onto which the three-dimensional object is projected in the volume rendering is set, two or more distance maps out of the plurality of reference distance maps are converted into two or more converted distance maps in accordance with a positional relation between two or more reference planes corresponding to the two or more distance maps and the actual projection plane, and integrating the resultants, thereby generating a distance map for visualization indicative of distribution of distances between the three-dimensional object and the actual projection plane.

14 Claims, 7 Drawing Sheets

IMAGE PROCESSING APPARATUS, AND COMPUTER PROGRAM

This application is based on application No. 2004-292410 filed in Japan, the contents of which are hereby incorporated by reference.

BACKGROUND OF THE INVENTION

1. Field of the Invention

The present invention relates to a technique of generating a display image by volume rendering.

2. Description of the Background Art

As a method of visualizing and displaying data indicative of a three-dimensional structure, a method called volume rendering is known. The volume rendering includes a method called ray casting.

The volume rendering is often used at the time of displaying a three-dimensional image, for example, as a medical-use image for a diagnosis in the medical field. For example, at the time of observing an affected area or the like while appropriately changing the direction of sight line, it is desired to switch a display image quickly so as not to apply stress on a user.

Various methods of increasing the speed of volume rendering have been consequently devised and proposed. Among them, volume rendering of a type is known in which each time the direction of sight line, that is, the projection plane is changed, first, a depth map indicative of a distribution of distances between the projection plane and a three-dimensional object is generated and sampling along each of sight lines is performed by using the generated depth map, so that volume data is visualized. It is known that an enormous amount of computation is necessary for generating a depth map indicative of the distance from a certain viewpoint to a three-dimensional object (for example, Japanese Patent Application Laid-Open No. 2000-105105).

The volume rendering using the depth map requires, however, some calculation time for regenerating a depth map each time the direction of sight line is changed. Consequently, it takes a long time to generate a display image and to switch the display image, and it is difficult to smoothly change a display image in accordance with the change of the projection plane, that is, the direction of sight line.

SUMMARY OF THE INVENTION

The present invention is directed to an image processing apparatus for generating a display image by volume rendering.

According to the present invention, the apparatus includes: a reader for reading and storing volume data of a three-dimensional object to be processed into a predetermined storage; a first setting part for setting a plurality of reference planes; a first generator for generating a reference distance map indicative of distribution of distances between the three-dimensional object and a reference plane included in the plurality of reference planes for each reference plane included in the plurality of reference planes; a second setting part for setting an actual projection plane onto which the three-dimensional object is projected in the volume rendering; and a second generator for converting two or more distance maps out of a plurality of reference distance maps generated by the first generator into two or more converted distance maps in accordance with a positional relation between two or more reference planes corresponding to the two or more distance maps and the actual projection plane and executing integration of the two or more converted distance maps, thereby generating a distance map for visualization indicative of distribution of distances between the three-dimensional object and the actual projection plane.

Since time required to generate a depth map according to a change in an actual projection plane can be suppressed, the speed of generation of a depth map in volume rendering can be increased.

The present invention is also directed to a computer program for controlling a computer to operate as an image processing apparatus for generating a display image by volume rendering.

It is therefore an object of the present invention to provide a technique capable of generating a depth map in volume rendering at higher speed.

These and other objects, features, aspects and advantages of the present invention will become more apparent from the following detailed description of the present invention when taken in conjunction with the accompanying drawings.

DESCRIPTION OF THE PREFERRED EMBODIMENT

A preferred embodiment of the present invention will be described below with reference to the drawings.

Outline of Image Processing System

Figure 1:
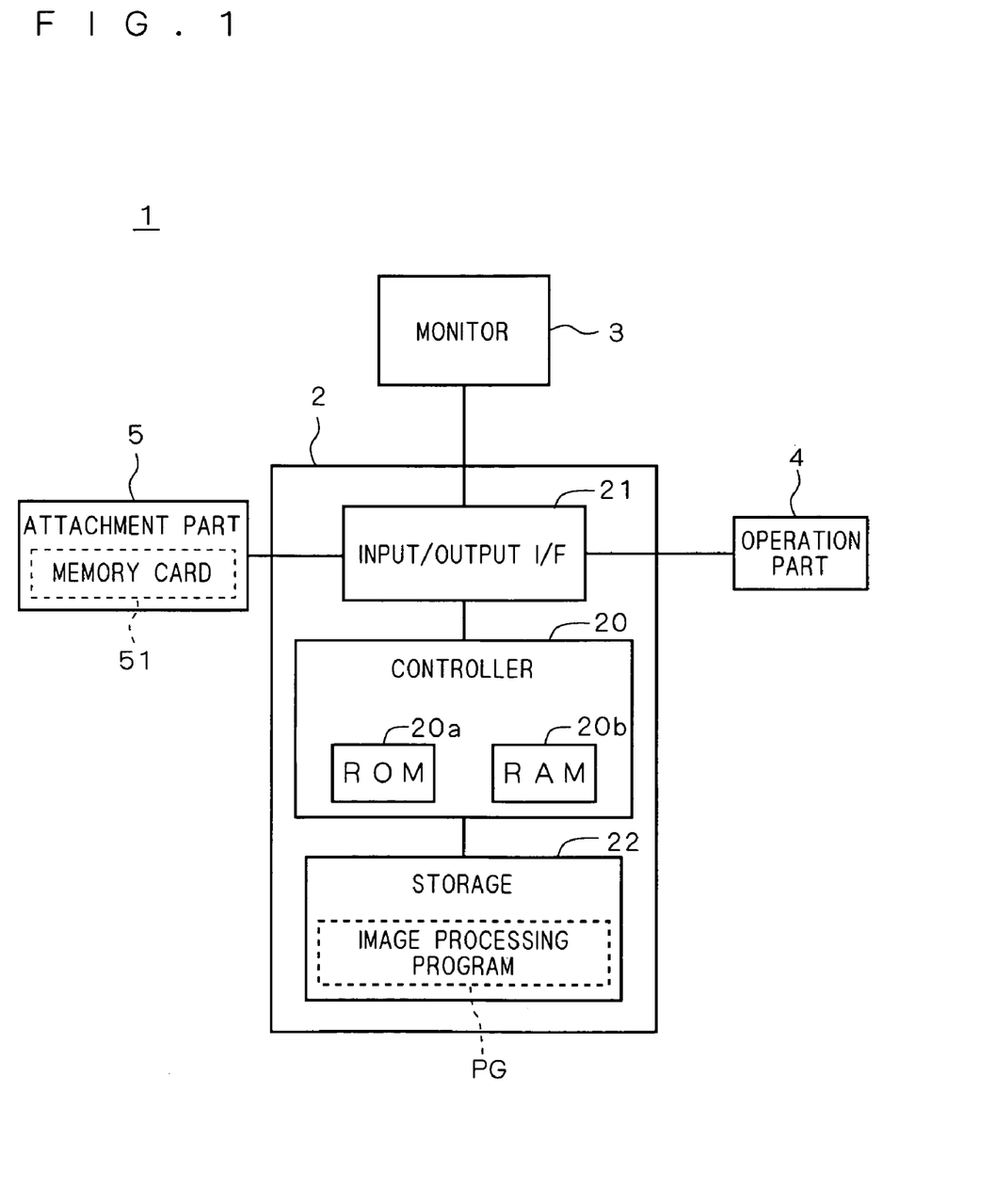
FIG. 1 illustrates an outline of an image processing system 1 according to a preferred embodiment of the present invention.

FIG. 1 illustrates an outline of an image processing system 1 according to a preferred embodiment of the present invention.

The image processing system 1 has a personal computer 2 (hereinafter, simply referred to as "PC"), a monitor 3 and an attachment part 5 connected to the PC 2 so as to be able to transmit/receive data to/from the PC 2, and an operation part 4 used by a user to enter various selection matters and the like to the PC 2.

The PC 2 includes a controller 20, an input/output I/F 21, and a storage 22.

The input/output I/F 21 is an interface (I/F) for transmitting/receiving data to/from the monitor 3, the operation part 4 and the attachment part 5, and transmits/receives data to/from the controller 20.

The storage 22 takes a form of, for example, a hard disk which stores an image processing program PG for realizing volume rendering which will be described later.

The controller 20 mainly has a CPU, a ROM 20a and a RAM 20b, and is a part for controlling the respective components in the PC 2 in a centralized manner. The controller 20 reads the image processing program PG stored in the storage 22 and executes it by the CPU, thereby executing volume rendering (visualization) of generating display image data (also referred to as "display image") on the basis of volume data, and outputs the display image to the monitor 3 via the input/output I/F 21. In such a manner, the PC 2 functions as an image processing apparatus for generating a display image on the basis of volume data by the volume rendering.

The monitor 3 takes a form of, for example, a CRT and visibly outputs the display image generated by the controller 20.

The operation part 4 is constructed by a keyboard, a mouse and the like, and transmits various electric signals to the input/output I/F 21 in accordance with various operations of the user. To the attachment part 5, a storing medium such as a memory card 51 can be inserted in an attachable/detachable manner. Various data, programs and the like stored in the memory card 51 inserted to the attachment part 5 can be loaded onto the controller 20 and the storage 22 via the input/output I/F 21.

Volume Rendering

Herein, a method is used, which is called voxel expression that expresses an object by a set of very small cubes (or rectangular parallelepipeds) as elements. The cube (or rectangular parallelepiped) as an element is called a voxel.

Generally, by employing a CT (Computed Tomography) scan using an X ray, an image of a slice of a human body can be obtained. By shifting the position of the slice and by changing the slicing direction in the vertical, depth and horizontal directions, data in which an X-ray absorption amount is stored can be obtained for each voxel. Data expressing a distribution of concentration or density in a three-dimensional space is called "volume data". Volume data is data obtained by dividing a three-dimensional area to be expressed by the volume data, that is, a three-dimensional area corresponding to volume data into a plurality of voxels, and giving one voxel value (herein, a value indicative of an absorption amount of an X ray) to each voxel. The three-dimensional area corresponding to the volume data is an object to be subjected to a computing process in the volume rendering based on the volume data.

In the volume rendering in the image processing system 1, first, when volume data to be processed is designated, six projection planes as reference (also referred to as "reference projection planes") are set in six directions around an object of volume rendering, that is, a three-dimensional object specified by volume data. For each of the six reference projection planes, a depth map (also referred to as a "reference depth map" or "reference distance map") indicative of the distribution of distances between one of the six reference projection planes and the three-dimensional object is generated. Thereafter, when the direction of sight line of performing the volume rendering, that is, a projection plane on which a three-dimensional object is actually projected (also referred to as "actual projection plane") is set, a depth map (also referred to as "depth map for visualization" or "distance map for visualization") indicative of a distribution of distances between the actual projection planes used for visualization and a three-dimensional object is generated on the basis of two or more reference distance maps of two or more reference projection planes existing in the direction close to the actual projection plane of the three-dimensional object out of preliminarily generated six reference distance maps. With this configuration, in the image processing system 1, the speed of generation of a depth map in the volume rendering can be increased. It is assumed herein that orthogonal projection is performed in the volume rendering in the preferred embodiment.

The operation of volume rendering in the image processing system 1 will be described in detail below.

Figure 2:
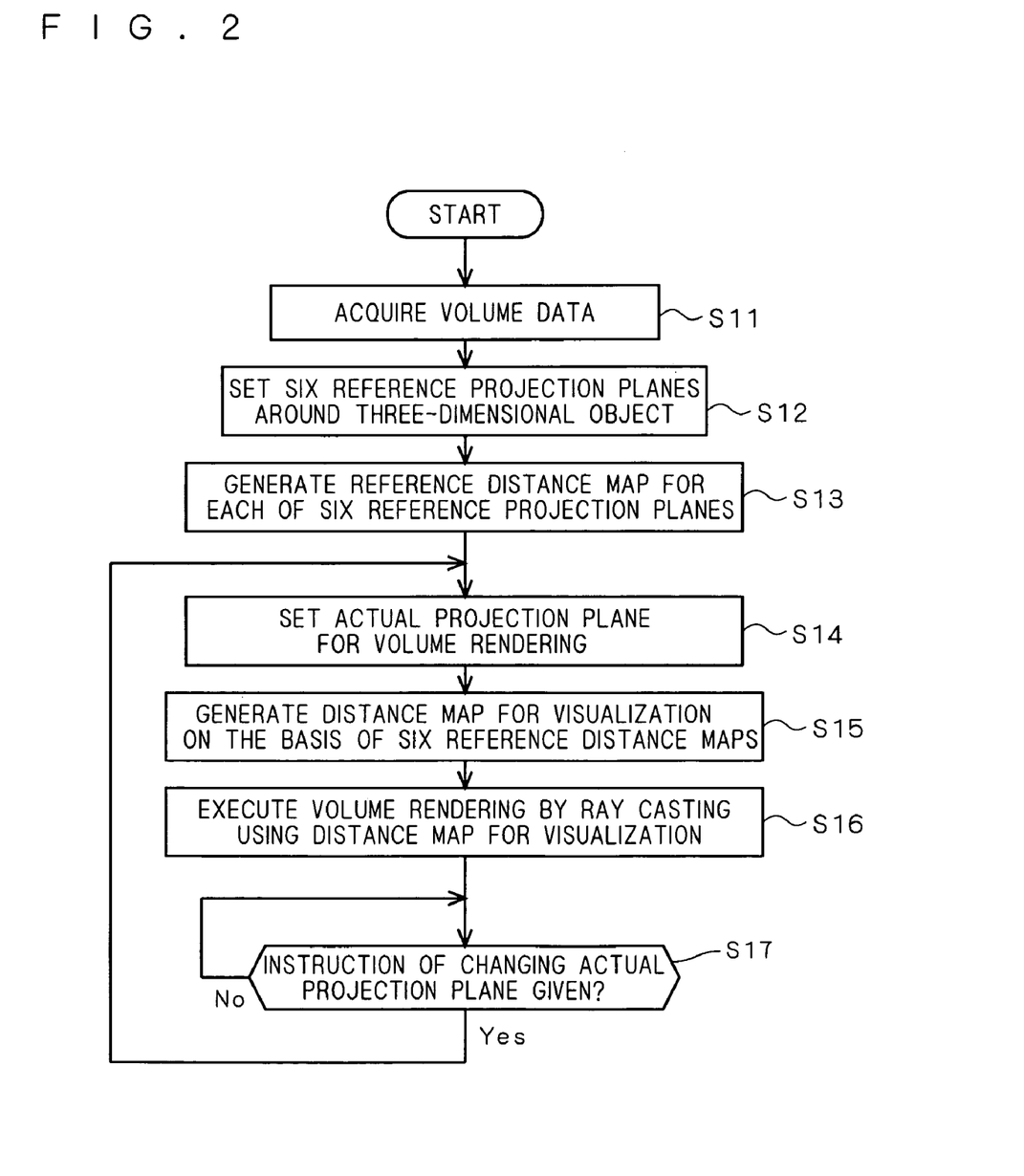
FIG. 2 is a flowchart showing an operation flow of volume rendering.

FIG. 2 is a flowchart showing an operation flow of volume rendering executed by the image processing system 1. The operation flow is realized when the controller 20 reads the image processing program PG stored in the storage 22 and executes it by the CPU. For example, when the user variously operates the operation part 4 to designate volume data to be processed, the operation flow of volume rendering starts and the program goes to step S11 in FIG. 2.

In step S11, volume data related to a three-dimensional area (that is, three-dimensional object) to be processed, which is stored in the memory card 51, the storage 22 or the like, is read and acquired by the controller 20. The volume data is temporarily stored in the RAM 20b functioning as storage means, and the program goes to step S12. Herein, it is also possible to perform a preprocess such as a filtering process for removing noise on the volume data by the controller 20.

Figure 3:
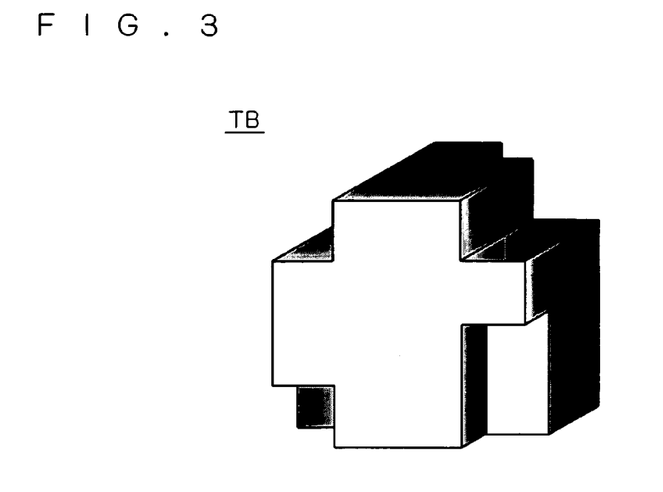
FIG. 3 illustrates a three-dimensional object.
Figure 4:
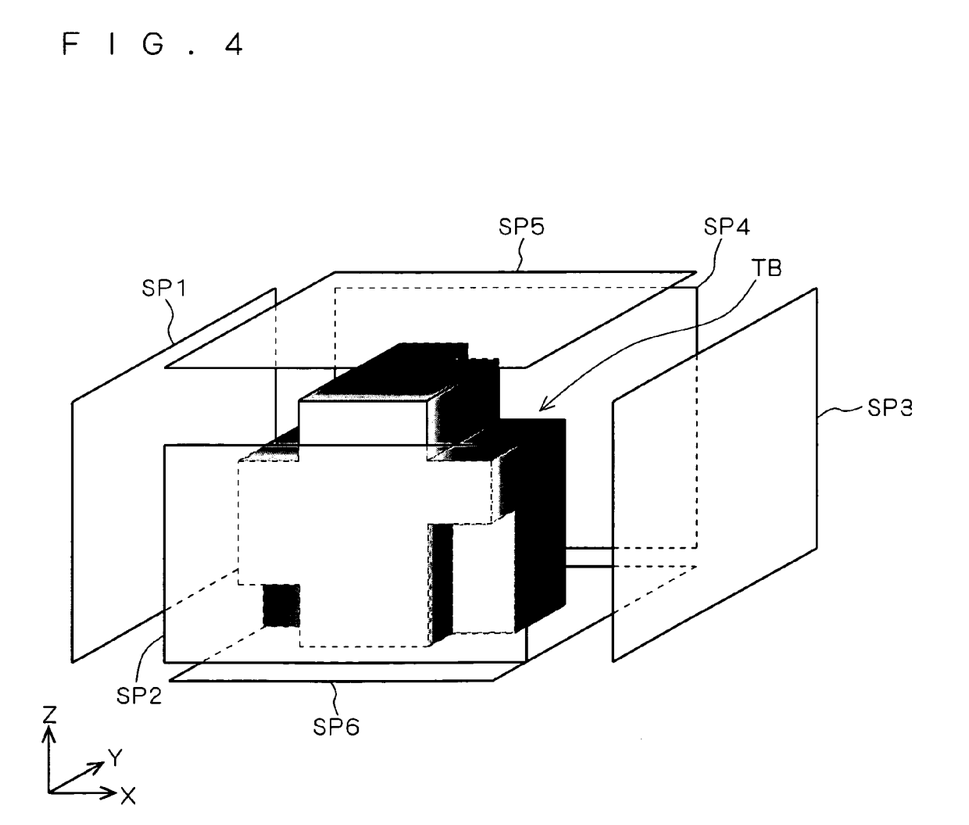
FIG. 4 illustrates setting of a reference projection plane.

In step S12, six reference projection planes are set around a three-dimensional object specified by the volume data acquired in step S11, and the program goes to step S13. FIG. 3 visibly shows an example of a three-dimensional object TB specified by the volume data. In step S12, as shown in FIG. 4, six reference projection planes SP1 to SP6 are set so as to surround the three-dimensional object TB. In FIG. 4, to clarify the azimuth relations, a three-dimensional orthogonal coordinate system of X, Y and Z is shown. The six reference projection planes SP1 to SP6 are planes each parallel to any of an XY plane, a YZ plane and an XZ plane, and are set so as to be orthogonal to each other. Concretely, the reference projection planes SP1 and SP3 are planes parallel to the YZ plane, the reference projection planes SP2 and SP4 are planes parallel to the XZ plane, and the reference projection planes SP5 and SP6 are planes parallel to the XY plane. Herein, for each of the reference projection panes SP1 to SP6, the direction opposite to the normal line direction (normal line vector) extending toward the three-dimensional object TB is stored in the RAM 20b as the direction (projection direction) in which the three-dimensional object is projected in each of the reference projection planes SP1 to SP6.

In step S13, the reference distance map indicative of the distribution of distances between the three-dimensional object and each of the reference projection planes is generated for each of the six reference projection planes SP1 to SP6, and the program goes to step S14. Herein, by a method similar to a general depth map generating method, cells (for example, voxels) constituting the three-dimensional object are projected onto the reference projection plane, thereby generating the reference distance map for each of the reference projection planes. Concretely, by projecting all of voxels constituting a three-dimensional object to be displayed onto the reference projection plane and writing the distance between a voxel and the reference projection plane in the position of each of the projected pixels, a reference distance map is generated. In the case where the distance value is already written at the time of writing the distance to each pixel, a relatively smaller value (that is, the case where the voxel is positioned relatively close to the reference projection plane) is employed.

In step S14, an actual projection plane on which the three-dimensional object is projected in the volume rendering is set, and the program goes to step S15. For example, by various operation of the user on the operation part 4, the direction of sight line at the time of visualizing the three-dimensional object is designated, and the actual projection plane is set.

Figure 5:
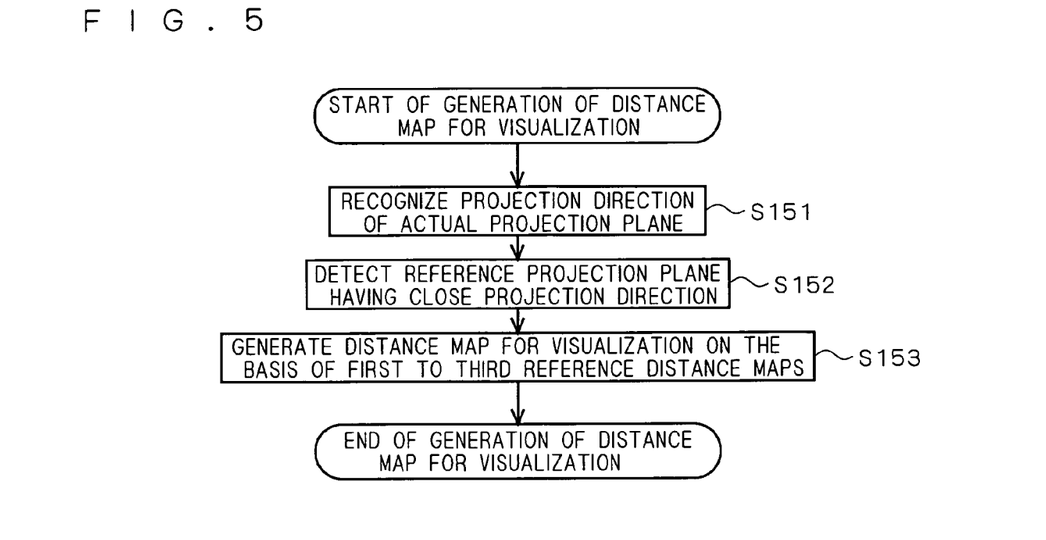
FIG. 5 is a flowchart showing an operation flow of generating a distance map for visualization.

In step S15, on the basis of the preliminarily generated six reference distance maps, a distance map for visualization of the actual projection plane is generated, and the program goes to step S16. FIG. 5 is a flowchart showing the operation flow of generating the distance map for visualization. When the program goes to step S15, the operation flow shown in FIG. 5 starts, and the program goes to step S151.

Figure 6:
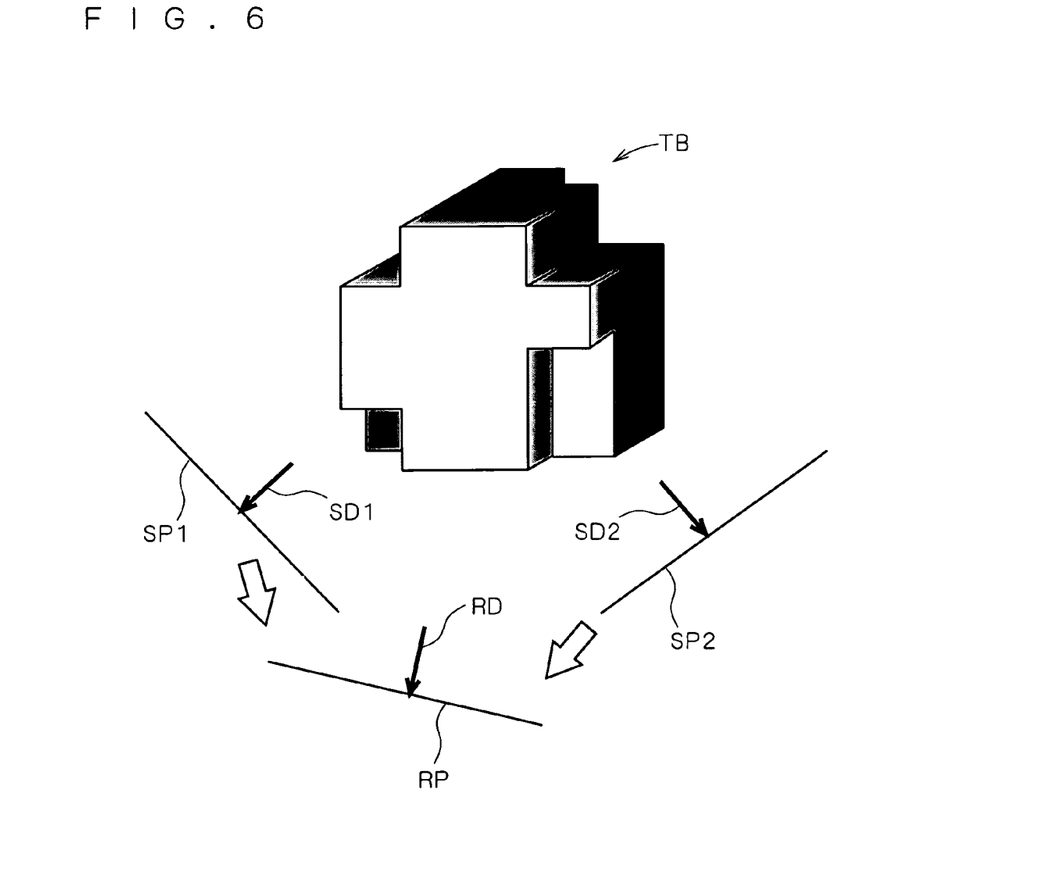
FIG. 6 illustrates generation of a distance map for visualization.

In step S151, the projection direction of the actual projection plane (the direction opposite to the direction of sight line), which is set in step S14, is recognized, and the program goes to step S152. For example, as shown in FIG. 6, a projection direction (projection vector) RD of an actual projection plane RP is recognized.

In step S152, the reference projection plane having the projection direction close to the projection direction of the actual projection plane is detected from the six reference projection planes, and the program goes to step S153. Herein, the reference projection plane whose projection direction has an angle smaller than 90 degrees from the direction (projection direction) in which the three-dimensional object is projected onto the actual projection plane is detected from among the six reference projection planes. That is, the reference projection plane facing the surface of the three-dimensional object facing the actual projection plane is detected. For example, as shown in FIG. 6, the reference projection planes SP1 and SP2 corresponding to the projection directions SD1 and SD2 each having an angle less than 90 degrees from the projection direction RD of the actual projection plane RP are detected.

Concretely, in the case where the projection direction of the actual projection plane and any one of the projection directions of the six reference projection planes SP1 to SP6 are the same, the reference projection plane having the same projection direction as the actual projection plane RP is detected. In such a case, one reference projection plane faces all of the surfaces of the three-dimensional object facing the actual projection plane, in other words, all of areas on the surface of the three-dimensional object projected onto the actual projection plane are projected onto one reference projection plane, so that one reference projection plane is detected.

In the case where the projection direction of the actual projection plane is not the same as any one of the projection directions of the six reference projection planes SP1 to SP6 and is parallel with any of the XY plane, YZ plane and XZ plane, two reference projection planes are detected. In such a case, almost all of areas on the surface of the three-dimensional object projected onto the actual projection plane are projected onto the two reference projection planes, so that the two reference projection planes are detected.

Further, in the case where the projection direction of the actual projection plane is not parallel with any of the XY plane, YZ plane and XZ plane, three reference projection planes are detected. In such a case, almost all of areas on the surface of the three-dimensional object projected onto the actual projection plane are projected onto the three reference projection planes, so that three reference projection planes are detected.

In step S153, the distance map for visualization is generated on the basis of the reference distance map generated for the reference projection plane detected in step S152. Thereafter, the operation flow of generating the distance map for visualization is finished.

Herein, the method of generating the distance map for visualization based on the reference distance map in step S153 will now be described with reference to FIG. 7. A case is assumed where there is a reference distance map $DM_0$ indicative of the distribution of distances between the three-dimensional object TB and the reference projection plane SD as shown in FIG. 7, and a distance map $DM_1$ for visualization indicative of the distribution of distances between the three-dimensional object TB and the actual projection plane RP is generated on the basis of the reference distance map $DM_0$ and the like.

Figure 7:
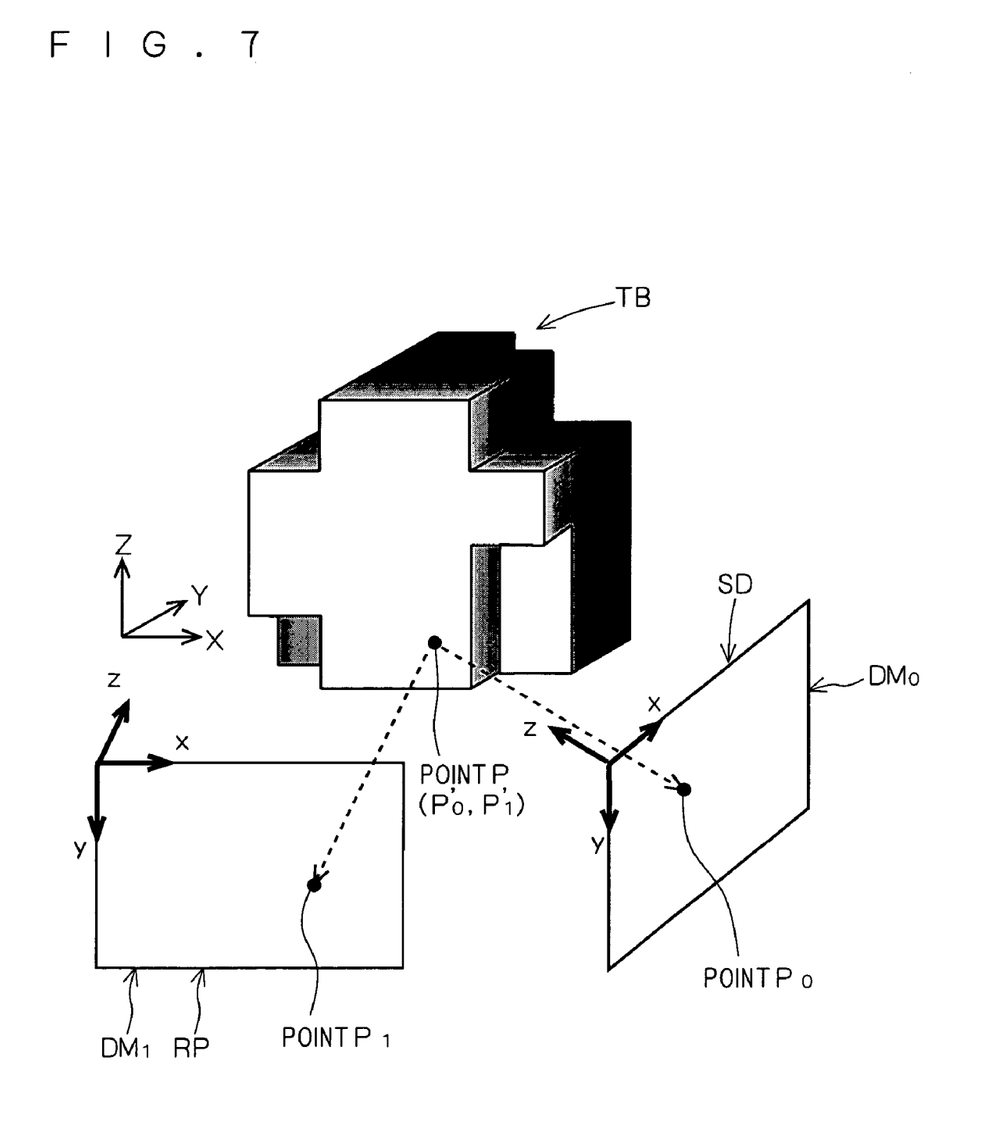
FIG. 7 illustrates generation of a distance map for visualization.

As shown in FIG. 7, an xyz orthogonal coordinate system is set for each of the distance maps $DM_0$ and $DM_1$ so that the upper left point is the origin, each of the projection planes is the xy plane, and the +z direction is the direction of sight line of each of the projection planes (the direction opposite to the projection direction). Combinations of a rotation matrix and a translation matrix for converting the world coordinate system, that is, the XYZ three-dimensional orthogonal coordinate system as a reference to a coordinate system which is set for each of the distance maps $DM_0$ and $DM_1$ are set as $(R_{0ij}, T_{0j})$ and $(R_{1ij}, T_{1j})$. Herein, i, j =1, 2, 3, each of the rotation matrixes $R_{0ij}$ and $R_{1ij}$ is a non singular matrix of 3×3, and each of the translation matrixes $T_{0j}$ and $T_{1j}$ is a matrix of 1×3, that is, a column vector. Since the position in the world coordinate system of each projection plane is determined at the time point when the six reference projection planes SP1 to SP6 and the actual projection plane are set, combinations of the rotation matrix and the translation matrix for converting the world coordinate system to the coordinate system of each projection plane can be determined.

A point $P_0$ $(X_0, Y_0)$ in the reference distance map $DM_0$ will be considered. It is assumed that a distance value $d_0$ is given to the point $P_0$. The point $P_0$ is a point corresponding to the point P on the three-dimensional object, that is, a point to which the point P is projected in the reference projection plane SD. The point P shown in the world coordinate system is converted to a coordinate system which is set for the reference distance map $DM_0$ by the rotation matrix $R_{0ij}$ and the translation matrix $T_{0j}$, and the point obtained after the coordinate conversion is set as a point $P_0'$. When the coordinate value of XYZ of the point P and the coordinate value of xyz of the point $P_0'$ are expressed as the matrixes (column vectors) $P_j$ and $P_{0j}'$ of 1×3 as shown in the following equation (1), the relation of the matrixes $P_j$ and $P_{0j}'$ is expressed by the following equation (2).

$$P_j = \begin{bmatrix} X \\ Y \\ Z \end{bmatrix}, P'_{0j} = \begin{bmatrix} x \\ y \\ z \end{bmatrix}, (j = 1, 2, 3) \qquad (1)$$

$$P'_{0j} = R_{0ij} \cdot P_j + T_{0j}, (i, j = 1, 2, 3) \qquad (2)$$

Herein, x, y and z in $P_{0j}'$ are $X_0$, $Y_0$, and $d_0$, respectively.

At the time of generating the distance map $DM_1$ for visualization, it is necessary to obtain a point $P_1$ corresponding to the point $P_0$ on the actual projection plane RP. By obtaining the coordinate position of the point P indicated in the world coordinate system on the original three-dimensional object from the point $P_0'$ expressed in the coordinate system which is set for the reference distance map $DM_0$ and converting the coordinate position of the point P to a coordinate position of the coordinate system which is set for the distance map for visualization, the coordinate position of the point $P_1$ can be obtained.

Concretely, first, since the rotation matrix $R_{0ij}$ is a nonsingular matrix of 3×3, an inverse matrix $R_{0ij}^{-1}$ can be obtained. By the following equation (3), a column vector $P_j$ can be obtained from the column vector $P_{0j}'$.

$$P_j = R_{0ij}^{-1} \cdot (P_{0j}' + T_{0j}), \; (i, j, = 1, 2, 3) \tag{3}$$

The coordinate position of the point P expressed in the world coordinate system is converted into a coordinate position of the coordinate system which is set for the distance map $DM_1$ for visualization by the rotation matrix $R_{1ij}$ and the translation matrix $T_{1j}$, and the point obtained by the coordinate conversion is expressed as a point $P_1'$. Further, when the coordinate value of xyz of the point $P_1'$ is expressed as a matrix (column vector) $P_{1j}'$ of 1×3 as shown in the following equation (4), the relation between the matrixes $P_j$ and $P_{1j}'$ is expressed by the following equation (5).

$$P_{1j}' = \begin{bmatrix} x \\ y \\ z \end{bmatrix}, (j = 1, 2, 3) \tag{4}$$

$$P_{1j}' = R_{1ij} \cdot P_j + T_{1j}, (i, j = 1, 2, 3) \tag{5}$$

By the following equation (6) obtained by substituting the equation (3) for the equation (5), the matrix $P_{1j}'$ can be obtained from the matrix $P_{0j}'$.

$$P_{1j}' = R_{1ij} \cdot \{P_{0i}^{-1} \cdot (P_{0j}' - T_{0j})\} + T_{1j} (i, j = 1, 2, 3) \tag{6}$$

Herein, x, y and z of the $P_{1j}'$ become $X_1$, $Y_1$, and a distance value $d_1$ indicative of the distance between the point P on the three-dimensional object and the point $P_1$ on the actual projection plane RP, respectively. Therefore, based on the information of the column vector $P_{0j}'$, that is, the coordinate position and the distance value of the point $P_0$, information of the coordinate positions and the distance value of the point $P_1$ can be obtained.

By performing such a calculation on each of the pixels of the reference distance map $DM_0$, the distance value on each of the pixels of the distance map $DM_1$ for visualization can be obtained.

In step S153, such computation is performed for each of the reference distance maps for the reference projection planes detected in step S152, thereby obtaining the distance value of each of the pixels of the distance map for visualization. At this time, in the case where a plurality of distance values are obtained for one of pixels in the distance map for visualization, a relatively small distance value, that is, the distance value indicative of a distance shortest from the three-dimensional object is employed. In such a manner, generation of the distance map for visualization based on the reference distance map detected in step S152 is realized.

Therefore, for example, when two or more reference projection planes are detected in step S152, reference distance maps of the two or more reference distance planes detected in step S152 out of the six reference distance maps are converted in accordance with the relative positional relation between the two or more reference projection planes and the actual projection plane, and the resultants are integrated, thereby generating the distance map for visualization.

Referring again to FIG. 2, the description will be continued.

In step S16, volume rendering by the ray casting using the distance map for visualization generated in step S15 is executed, and the program goes to step S17. Herein, a display image is generated by the volume rendering and output to the monitor 3. The display image is visibly displayed on the monitor 3.

The volume rendering using ray casting will now be described.

Figure 8:
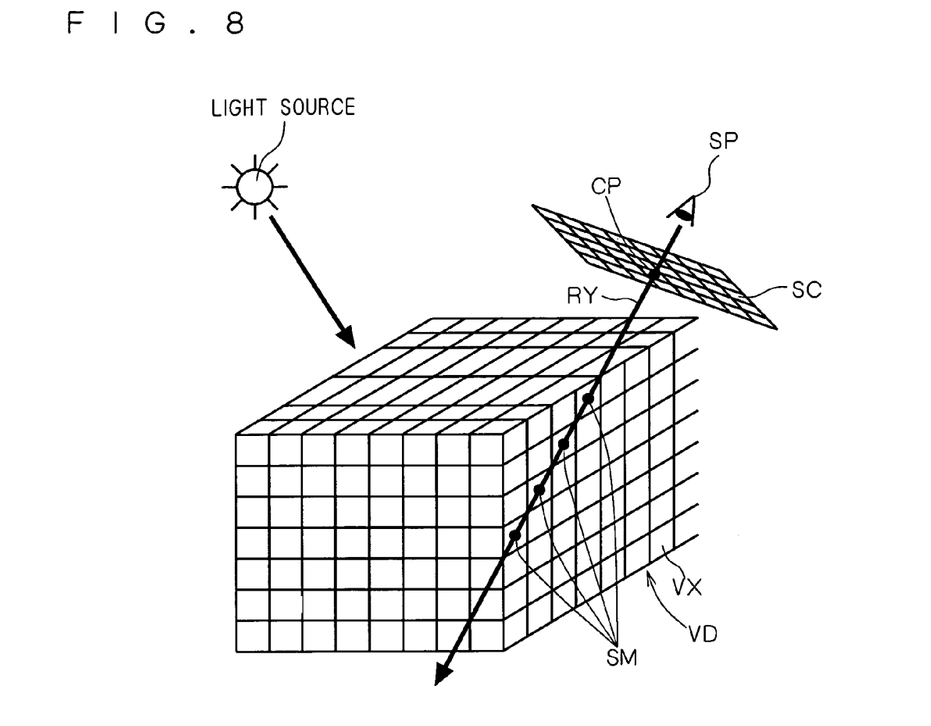
FIG. 8 illustrates volume rendering using ray casting.
Figure 9:
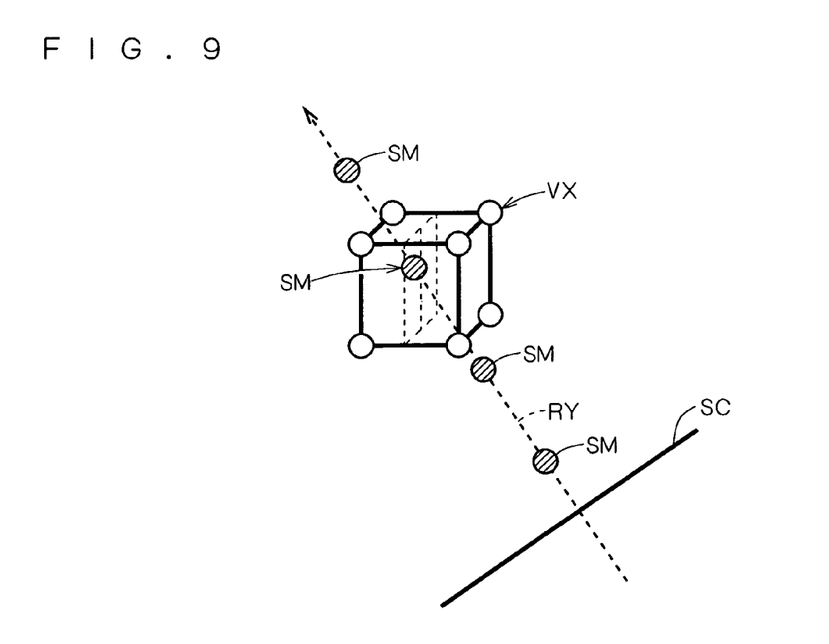
FIG. 9 illustrates volume rendering using ray casting.

FIGS. 8 and 9 are conceptual diagrams for describing the volume rendering using ray casting.

In the volume rendering using ray casting, for example, as shown in FIG. 8, voxel data VD distributed in a three-dimensional space is sampled at sampling points SM at predetermined intervals along a ray (also referred to as sight line) RY emitted from an arbitrary viewpoint SP via a predetermined point CP on the actual projection plane SC. By adding the sampling values, a semitransparent display image (display image) is generated finally. It is assumed herein that orthogonal projection is performed. Each of the points CP on the actual projection plane SC is a point (also referred to as "pixel corresponding point") corresponding to a pixel in the display image to be finally generated. A pixel whose pixel value is to be calculated among the pixels on the display image is also called a "target pixel". In the volume rendering, by displaying a semitransparent image, the inside of an object is visually displayed. This is realized by giving opacity α to each voxel VX.

In the volume rendering using ray casting, the product between the brightness value of a voxel and the opacity α is sequentially added up from the viewpoint SP side along the ray RY. When the sum of α becomes 1 or when the ray RY goes out from the target volume, a process on the target pixel (the pixel corresponding point CP corresponding to the target pixel) is finished. A result of the addition is employed as the value of the target pixel (pixel value).

The brightness value and opacity at the present sampling point are set to c and α, respectively. The relation between an integrated brightness value $C_{in}$ of light incident on the sampling points lined along a sight line and an integrated brightness value $C_{out}$ of light after the sampling point is expressed as the following equation (7).

$$C_{out} = C_{in}(1-\alpha) + C\alpha \tag{7}$$

As shown in FIG. 9, the brightness value and the opacity at the sampling point (hatched circles in FIG. 9) SM in ray casting are obtained by linear interpolation from the brightness values and opacities of eight adjacent voxels (the center point of the voxel is indicated by a blank circle in FIG. 9).

Figure 10:
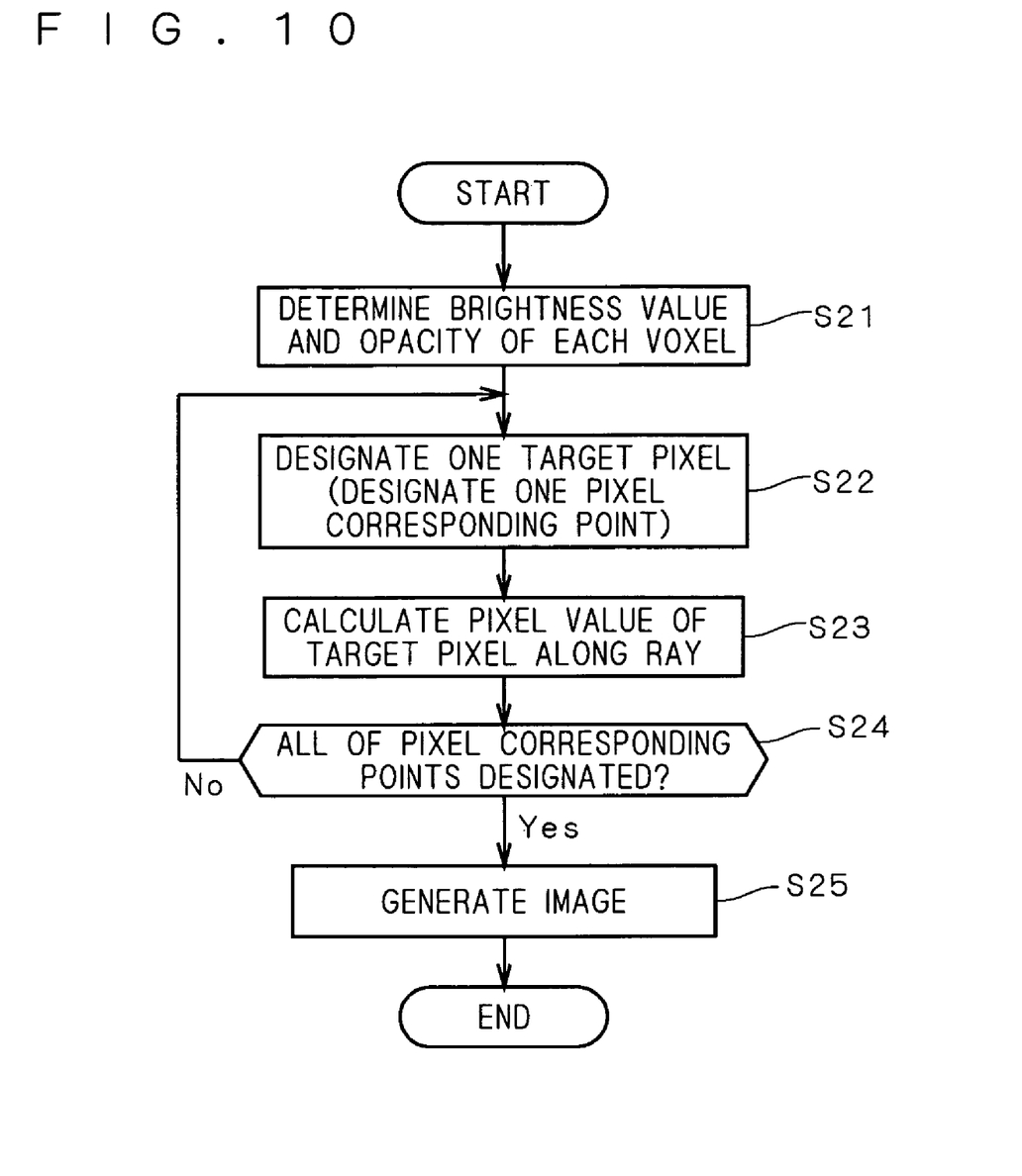
FIG. 10 is a flowchart showing an operation flow of volume rendering using ray casting.

FIG. 10 is a flowchart showing the operation flow of volume rendering using the ray casting.

When the operation flow of volume rendering using the ray casting starts, first, the brightness value and opacity of each voxel are determined (step S21). By adding products between the brightness values and opacities along a ray from a pixel corresponding point in the display image generated finally on the actual projection plane, a final pixel value of each target pixel is obtained and one image (display image) is generated (steps S22 to S25).

Sampling is performed along each of rays. At the time of adding the products each between the brightness value and the opacity, the start point of sampling is determined by using a distance map. This is a known matter in volume rendering of generating and using a distance map (depth map). Concretely, since a rough distance value from each of the pixel corresponding points to the three-dimensional object is given in the distance map for visualization, by referring to the distance map for visualization, how far from the actual projection plane SC the three-dimensional object exists can be recognized for each ray. Therefore, in order to prevent useless sampling process and computation from being performed in a position where no three-dimensional object exists, by referring to the distance map for visualization, sampling can be performed from the point of the corresponding distance value or larger for each ray. Further, by referring to the distance map for visualization, a state where no three-dimensional object exists on a ray can be also recognized. Consequently, a ray which does not have to be sampled can be also detected, and useless sampling can be omitted more.

Herein, a method of calculating the brightness value c and the opacity α of each voxel will be described.

The brightness value c of each voxel is calculated by the following equation (8) from the Phong's shading model using a normal vector N estimated from the gradient of neighboring voxel values.

$$c = c_p k_a + \frac{c_p}{k_1 + k_2 d}[k_d(N \cdot L) + k_s(N \cdot H)] \quad (8)$$

Herein, $c_p$ denotes light source intensity, and $k_a$, $k_d$ and $k_s$, indicate the ratios of environmental light, diffusion light and mirror reflection light components, respectively. Also, d denotes the distance from the actual projection plane to a voxel, and $k_1$ and $k_2$ denote parameters of depth coding which increases the intensity of light with increasing proximity to the actual projection plane. L denotes a unit direction vector from a voxel toward the light source, and H indicates a vector for obtaining regular reflection light and is obtained by the following equation (9) using the sight line direction vector V indicative of the direction of the ray.

$$H=(V+L)/|V+L| \quad (9)$$

The normal vector N of a voxel value f(i, j, k) is obtained by the following equation (10). The voxel value f(i, j, k) indicates a voxel value in the coordinates of x=i, y=j and z=k in the case where a three-dimensional space is expressed by a three-dimensional rectangular coordinate system of X, Y and Z.

$$N=\nabla f(i,j,k)/|\nabla f(i,j,k)| \quad (10)$$

Herein, $\nabla f(i, j, k)$ is expressed by the following equation (11) as gradients in the X, Y and Z directions of the voxel value.

$$\nabla f(i,j,k)=[(f(i+1,j,k)-f(i-1,j,k)),$$

$$(f(i,j+1,k)-f(i,j-1,k)),$$

$$(f(i,j,k+1)-f(i,j,k-1))] \quad (11)$$

In the case where a display image obtained by the rendering is a color image, for example, by executing similar calculations using the equations (8) to (11) for each of the components of R (red), G (green) and B (blue) of the light source, pixel values of R, G and B for each target pixel can be obtained.

In the equations (8) to (11), the light source intensity $c_p$, the ratio $k_a$ of the environmental light component, the ratio $k_d$ of the diffusion light component, the ratio $k_s$, of the mirror reflection light component, and the parameters $k_1$ and $k_2$ of the depth coding are set to proper values by the user. The unit direction vector L is obtained by setting of the position of the light source and the positional relation between the light source and a voxel. The sight line direction vector V indicative of the direction of the ray is obtained by setting of the position of the visual point SP. Therefore, all of the values in the right side of the equation (8) are determined, so that the brightness value c of each voxel can be calculated.

On the other hand, the opacity α can be calculated by the following equation (12).

$$\alpha=\alpha_{n+1}(f-f_n)/(f_{n+1}-f_n)+\alpha_n(f_{n+1}-f)/(f_{n+1}-f_n) \quad (12)$$

Herein, f(i, j, k) is simply indicated as f, $f_n$ indicates the minimum voxel value in the range of voxel values to which opacity is desired to be given, and $f_{n+1}$ indicates the maximum voxel value in the range of voxel values to which opacity is desired to be given. Also, $\alpha_n$ indicates opacity when the voxel value is $f_n$, and $\alpha_{n+1}$ indicates opacity when the voxel value is $f_{n+1}$. Further, opacity is computed by the equation (12) when the relation of $f_n<f<f_{n+1}$, is satisfied. When the relation of $f_n<f<f_{n+1}$ is not satisfied, α is set to zero (α=0).

Referring back to FIG. 2, the description will be continued.

In step S17, whether an instruction (change instruction) of changing the actual projection plane exists or not is determined. For example, the user can give an instruction of changing the direction of sight line used at the time of visualizing a three-dimensional object, that is, an actual projection plane by variously operating the operation part 4. When there is no instruction of changing the actual projection plane, the determination of step S17 is repeated. When there is an instruction of changing the actual projection plane, the program returns to step S14, and the volume rendering is executed on the changed actual projection plane to generate a display image.

For example, by forcedly finishing the operation flow of volume rendering in accordance with an operation on the operation part 4 of the user or the like, the program can forcedly leave the operation flow shown in FIG. 2.

As described above, in the image processing system 1 according to the preferred embodiment of the present invention, when the controller 20 reads volume data of a three-dimensional object to be processed, first, six reference distance maps indicative of distributions of distances between the three-dimensional object and the six reference projection planes SP1 to SP6 are generated. Next, the actual projection plane on which the three-dimensional object is to be projected in volume rendering is set. In the case where two or more reference projection planes each having a projection direction close to the projection direction of the actual projection plane are detected from the six reference projection planes SP1 to SP6, a plurality of reference distance maps of the two or more detected reference projection planes are converted by the rotation matrix and translation matrix in accordance with the relative positional relation between the detected plural reference projection planes and the actual projection plane, and the resultants are integrated, thereby generating the distance map for visualization indicative of distribution of distances between the three-dimensional object and the actual projection plane.

With such a configuration, as compared with the conventional method of detecting a distance from the actual projection plane every small area such as a voxel constituting a three-dimensional object and generating a distance map for visualization while preferentially employing a small distance value, the computation amount of generation of a distance map for visualization on the basis of six reference distance maps which are preliminarily generated is smaller. Therefore, generation time of a depth map according to a change in the actual projection plane can be suppressed, so that the speed of generation of a depth map in the volume rendering can be increased. As a result, a display image can be smoothly changed in accordance with a change in the projection plane, that is, the direction of sight line.

In hybrid-type volume rendering, a distance map for visualization used as intermediate data is generated on the basis of a plurality of reference distance maps. Consequently, the precision of the distance map for visualization generated by the configuration of the preferred embodiment is lower than that of the distance map for visualization directly obtained with respect to the actual projection plane by the conventional technique. However, the distance map for visualization is data used at an intermediate stage and does not exert an influence on the precision of the display image generated finally. From the viewpoint of precision of a display image, it is unnecessary to consider deterioration in the precision of the distance map for visualization.

Modifications

Although the preferred embodiment of the present invention have been described above, the present invention is not limited to the above description.

For example, in the foregoing preferred embodiment, the reference distance map for generating the distance map for visualization related to the actual projection plane is determined by detecting the reference projection plane corresponding to the projection direction forming an angle less than 90 degrees from the projection direction of the actual projection plane. However, the present invention is not limited thereto. For example, the center point of a three-dimensional area of volume data to be processed is set as a reference, and the position of the intersecting point between a perpendicular extending from the center point to each of the reference projection planes and each reference projection plane is expressed by longitude and latitude using a predetermined position as a reference and is stored as information indicative of the directional relations of the reference projection planes. Once an actual projection plane is set, the longitude and latitude of the position of the intersecting point between the perpendicular extending from the center point to the actual projection plane and the actual projection plane are detected, and at least one reference projection plane forming an angle of less than 90 degrees from the longitude and latitude of the actual projection plane is detected. In such a manner, at least one reference distance map corresponding to the at least one detected projection plane may be employed as a reference distance map for generating a distance map for visualization related to the actual projection plane.

In the foregoing preferred embodiment, the reference distance map is generated for each of the six reference projection planes SP1 to SP6 provided so as to surround a three-dimensional object. The present invention is not limited thereto. For example, it is also possible to set a reference projection plane on each of planes of a regular tetrahedron surrounding a three-dimensional object, that is set a plurality of (for example, four) reference projection planes, and generate a plurality of reference distance maps corresponding to the plurality of reference projection planes. With such a configuration, effects similar to those of the foregoing preferred embodiment can be obtained.

In order to increase the precision of a distance map for visualization generated on the basis of at least one reference distance map, the larger the number of the plurality of reference projection planes whose directions set with respect to a three-dimensional object are different from each other is and, moreover, the larger the number of reference distance maps is, the more it is preferable. When the number of reference distance maps is large, however, a calculation amount in the beginning of volume rendering is large, and there is a disadvantage that it takes a long time to generate a first display image. If the data amount of the reference distance map increases excessively, in relation to the capacity of a memory (for example, the data amount exceeds the capacity of a primary cache which enables high-speed reading), it takes long time to read data of the reference distance map at the time of generating a distance map for visualization. As a result, a disadvantage occurs such that it takes long time to generate a display image in response to a change in the sight line direction. Therefore, it is necessary to appropriately set the number of reference projection planes, that is, reference distance maps in accordance with the specifications of the apparatus such as the calculation speed and the memory capacity.

When the range in which the sight line direction used at the time of performing volume rendering can be changed is limited, the number of the reference projection planes, that is, the reference distance maps can be suppressed to a relatively small number such as two.

For example, two reference projection planes are set around a three-dimensional object. Limitations are given such that first and second normal line vectors of the two reference planes extending from the two reference planes toward the three-dimensional object form an angle which is less than 180 degrees, a third normal vector of an actual projection plane extending from the actual projection plane toward the three-dimensional object exists on a plane formed by the first and second normal vectors, and the third normal vector is set in an angle range in which the first and second normal vectors form an angle less than 180 degrees. The distance map for visualization of the actual projection plane can be generated on the basis of the reference distance maps of the two reference projection planes.

For example, it is also possible to set only the two reference projection planes SP1 and SP2 shown in FIG. 4 and to set an actual projection plane so that the normal vector toward a three-dimensional object of an actual projection plane lie in an angle range in which the normal vectors of the two reference projection planes SP1 and SP2 form an angle which is less than 180 degrees (herein, 90 degrees) on a plane (XY plane). The normal vectors toward the three-dimensional object of the reference projection planes SP1 and SP2 are included in the XY plane. That is, the normal vector of the actual projection plane is parallel with the XY plane and is oriented in the +X and +Y directions.

By such settings, the two reference projection planes SP1 and SP2 face almost all of the surfaces of the three-dimensional object facing the actual projection plane. In other words, almost all of areas of the surface of the three-dimensional object projected onto the actual projection plane are projected onto the two reference projection planes SP1 and SP2. Therefore, the reference distance map is generated in advance for each of the two reference projection planes SP1 and SP2. According to the positional relation between the two reference projection planes SP1 and SP2 and the actual projection plane, the two reference distance maps are converted, and the resultants are integrated. In such a manner, a distance map for visualization can be generated.

With such a configuration, although the range in which the direction of sight line can be changed is limited, the number of reference distance maps is small, and the calculation load of the reference distance maps can be reduced. For example, when the capacity of a memory for temporarily storing a plurality of reference distance maps is considered, the speed of reading from the memory can be further increased. As a result, a depth map can be generated at higher speed.

Although the case of reading volume data of one three-dimensional object and performing volume rendering has been described in the foregoing preferred embodiment, the present invention is not limited thereto. For example, the present invention can be also applied to the case of reading volume data of a three-dimensional area to be processed, which includes a plurality of three-dimensional objects, and performing volume rendering. For example, a plurality (e.g., six as in the forgoing preferred embodiment) of reference distance maps are generated for each of a plurality of three-dimensional objects such as a tree and a rock. In response to setting of an actual projection plane, a distance map for visualization may be generated on the basis of a plurality of reference distance maps corresponding to the objects.

While the invention has been shown and described in detail, the foregoing description is in all aspects illustrative and not restrictive. It is therefore understood that numerous modifications and variations can be devised without departing from the scope of the invention.

What is claimed is:

1. An image processing apparatus for generating a display image by volume rendering, comprising:
   a reader for reading and storing volume data of a three-dimensional object to be processed into a predetermined storage;
   a first setting part for setting a plurality of reference planes;
   a first generator for generating a reference distance map indicative of distribution of distances between said three-dimensional object and a reference plane included in said plurality of reference planes for each reference plane included in said plurality of reference planes;
   a second setting part for setting an actual projection plane onto which said three-dimensional object is projected in said volume rendering; and
   a second generator for converting two or more distance maps out of a plurality of reference distance maps generated by said first generator into two or more converted distance maps in accordance with a positional relation between two or more reference planes corresponding to said two or more distance maps and said actual projection plane and executing integration of said two or more converted distance maps, thereby generating a distance map for visualization indicative of distribution of distances between said three-dimensional object and said actual projection plane.

2. The image processing apparatus according to claim 1, wherein
   said first setting part sets two reference planes,
   first and second normal vectors of said two reference planes extending from said two reference planes toward said three-dimensional object form an angle which is less than 180 degrees, and
   a third normal vector of said actual projection plane extending from said actual projection plane toward said three-dimensional object exists on a plane formed by said first and second normal vectors.

3. The image processing apparatus according to claim 1, wherein
   said plurality of reference planes are constructed by a plurality of sets each having two parallel planes disposed so as to sandwich said three-dimensional object.

4. The image processing apparatus according to claim 1, wherein
   said plurality of reference planes are six planes which can form a rectangular parallelepiped surrounding said three-dimensional object.

5. The image processing apparatus according to claim 1, wherein
   said plurality of reference planes are four planes which can form a tetrahedron surrounding said three-dimensional object.

6. The image processing apparatus according to claim 1, wherein
   said two or more reference planes each having a projection direction forming an angle with a projection direction of said actual projection plane, which is less than 90 degrees are selected from said plurality of reference planes.

7. The image processing apparatus according to claim 1, wherein
   said integration is executed by converting each of coordinates on each reference plane expressed by a world coordinate system of said two or more distance maps to a coordinate on said actual projection plane by using a matrix.

8. A computer readable medium embodied with a computer program, said computer program for controlling a computer to operate as an image processing apparatus for generating a display image by volume rendering, wherein said computer program comprises computer executable code for:
   reading and storing volume data of a three-dimensional object to be processed into a predetermined storage;
   setting a plurality of reference planes;
   generating a reference distance map indicative of distribution of distances between said three-dimensional object and a reference plane included in said plurality of reference planes for each reference plane included in said plurality of reference planes;
   setting an actual projection plane onto which said three-dimensional object is projected in said volume rendering; and
   converting two or more distance maps out of a plurality of reference distance maps generated by said first generator into two or more converted distance maps in accordance with a positional relation between two or more reference planes corresponding to said two or more distance maps and said actual projection plane and executing integration of said two or more converted distance maps, thereby generating a distance map for visualization indicative of distribution of distances between said three-dimensional object and said actual projection plane.

9. The computer readable medium according to claim 8, wherein
   said computer executable code for setting a plurality of reference planes sets two reference planes,
   first and second normal vectors of said two reference planes extending from said two reference planes toward said three-dimensional object form an angle which is less than 180 degrees, and
   a third normal vector of said actual projection plane extending from said actual projection plane toward said three-dimensional object exists on a plane formed by said first and second normal vectors.

10. The computer readable medium according to claim 8, wherein
said plurality of reference planes are constructed by a plurality of sets each having two parallel planes disposed so as to sandwich said three-dimensional object.

11. The computer readable medium according to claim 8, wherein
said plurality of reference planes are six planes which can form a rectangular parallelepiped surrounding said three-dimensional object.

12. The computer readable medium according to claim 8, wherein
said plurality of reference planes are four planes which can form a tetrahedron surrounding said three-dimensional object.

13. The computer readable medium according to claim 8, wherein
said two or more reference planes each include a projection direction forming an angle with a projection direction of said actual projection plane, which is less than 90 degrees are selected from said plurality of reference planes.

14. The computer readable medium according to claim 8, wherein
said integration is executed by converting each of coordinates on each reference plane expressed by a world coordinate system of said two or more distance maps to a coordinate on said actual projection plane by using a matrix.

* * * * *